US010281253B2

(12) United States Patent
Stark et al.

(10) Patent No.: US 10,281,253 B2
(45) Date of Patent: May 7, 2019

(54) CARTRIDGE RELOADING IMPROVEMENTS

(71) Applicant: Mark 7 Reloading LLC, Newton, MA (US)

(72) Inventors: Martin Stark, Sherborn, MA (US); Jay C. Hirshberg, Newton, MA (US); Anthony Parillo, Sherborn, MA (US); Kai Cao, Somerville, MA (US)

(73) Assignee: Mark 7 Reloading LLC, Fort Myers, FL (US)

( * ) Notice: Subject to any disclaimer, the term of this patent is extended or adjusted under 35 U.S.C. 154(b) by 0 days.

(21) Appl. No.: 15/535,176

(22) PCT Filed: Dec. 1, 2015

(86) PCT No.: PCT/US2015/063162
§ 371 (c)(1),
(2) Date: Jun. 12, 2017

(87) PCT Pub. No.: WO2016/094123
PCT Pub. Date: Jun. 16, 2016

(65) Prior Publication Data
US 2017/0370685 A1 Dec. 28, 2017

Related U.S. Application Data

(63) Continuation of application No. 14/568,310, filed on Dec. 12, 2014.

(30) Foreign Application Priority Data

Feb. 2, 2015 (EP) .................................. 15153471

(51) Int. Cl.
*F42B 33/00* (2006.01)
*F42B 33/02* (2006.01)
(Continued)

(52) U.S. Cl.
CPC .......... *F42B 33/001* (2013.01); *F16D 1/0817* (2013.01); *F16D 1/0894* (2013.01);
(Continued)

(58) Field of Classification Search
CPC ............................. F42B 33/004; F42B 33/001
(Continued)

(56) References Cited

U.S. PATENT DOCUMENTS 1,803,776 A * 5/1931 Seitz ....................... F16D 17/00
192/30 R
7,743,692 B2 * 6/2010 Jackson ................... F42B 33/10
86/23
(Continued)

FOREIGN PATENT DOCUMENTS

DE         30 16 944        11/1981

OTHER PUBLICATIONS

YouTube, "Dillon 1050 full auto PC—pic controlled" (published on Aug. 19, 2014) [online], [retrieved on Dec. 3, 2014], Retrieved from the Internet: http://www.youtube.com/watch?v=Ec 2BI6eep8 (Year: 2014).*
(Continued)

*Primary Examiner* — Samir Abdosh
(74) *Attorney, Agent, or Firm* — Fish & Richardson P.C.

(57) ABSTRACT

Among other things, a digitally controlled actuator has a connector for coupling to a drive mechanism of an existing hand-driven cartridge reloader, to actuate a series of processing cycles of the reloader in which supplies of components are subjected to successive mechanical processing steps to produce reloaded cartridges ready for use. There are sensors associated with the actuator and the reloader to (a) acquire digital information that is indicative of a state of progress of each of the processing cycles and of conditions of the reloader related to the production of the reloaded (Continued)

cartridges, and (b) deliver the digital information to a digital controller for controlling the processing cycles of the reloader. The digital controller is connected to receive the digital information from the sensors and to control automatic operation of the reloader in successive processing cycles to produce reloaded cartridges without requiring human intervention.

61 Claims, 14 Drawing Sheets

(51) Int. Cl.
*F16D 1/08* (2006.01)
*F16D 17/00* (2006.01)

(52) U.S. Cl.
CPC ............ *F16D 17/00* (2013.01); *F42B 33/004* (2013.01); *F42B 33/0207* (2013.01); *F42B 33/0278* (2013.01)

(58) Field of Classification Search
USPC ...................................................... 86/23–28
See application file for complete search history.

(56) References Cited

U.S. PATENT DOCUMENTS

| 8,820,206 | B2* | 9/2014 | Coma Asensio | B65G 47/1457 86/19.5 |
| 9,151,583 | B1* | 10/2015 | Stark | F42B 33/004 |
| 2006/0180011 | A1* | 8/2006 | Benn | F42B 33/02 86/27 |
| 2006/0180012 | A1* | 8/2006 | Benn | F42B 33/02 86/28 |
| 2016/0084624 | A1* | 3/2016 | Pruett | F42B 33/004 86/23 |
| 2016/0209193 | A1* | 7/2016 | Poehlman | F42B 33/10 |

OTHER PUBLICATIONS

Dillon Super 1050 Instruction Manual, published by DPP Inc. May 2007.*
Hornady Manufacturing Company, Lock-N-Load® Control Panel [online], [retrieved on Dec. 1, 2014]. Retrieved from the Internet: http://www.hornady.com/store/Lock-N-Load-Control-Panel, 3 pages.
You Tube, "Dillon 1050 auto with PLC" (published on Apr. 23, 2013) [online], [retrieved on Dec. 3, 2014]. Retrieved from the Internet: http://www.youtube.com/watch?v=N_0n_1ha9W, 2 pages.
You Tube, "Dillon Super 1050 Autodrive" (published on Jul. 23, 2012) [online], [retrieved on Dec. 3, 2014]. Retrieved from the Internet: http://www.youtube.com/watch?v=rsn8o5OCFVk, 3 pages.
You Tube, "Dillon 1050's automated" (published on Oct. 10, 2013) [online], [retrieved on Dec. 3, 2014]. Retrieved from the Internet: http://www.youtube.com/watch?v=-TOINwkvhNI, 2 pages.
You Tube, "Dillon 1050 full auto PC—plc controlled" (published on Aug. 19, 2014) [online], [retrieved on Dec. 3, 2014]. Retrieved from the Internet: http://www.youtube.com/watch?v=Ec_2BI6eep8, 2 pages.
You Tube, "Dillon XL650 Automatic by Maurizio Boccia" (published on Feb. 18, 2012) [online], [retrieved on Dec. 3, 2014]. Retrieved from the Internet: http://www.youtube.com/watch?v=-B2gxwHU58Q, 2 pages.
You Tube, Maurizio Boccia: "Dillon 1050 full auto PC—plc controlled," published on Aug. 19, 2014 [online], [retrieved on Jun. 2, 2015]. Retrieved from the Internet: URL:https://www.youtube.com/watch?v=Ec_2BI6eep8 (* 0:22 *, * 0:26 *, * 0:38 *, * 2:13 *).
You Tube, atvraceryfz: "Dillon 1050 PLC 45ACP," published on Jun. 23, 2013 [online] [retrieved on Jun. 2, 2015]. Retrieved from the Internet: URL:https://www.youtube.com/watch?v=1UEXjB-nceE (* 0:14 *, * 0:36*).
European Search Report for App. Ser. No. 15153471.6, dated May 29, 2015.
USPTO Non-Final Office Action in U.S. Appl. No. 14/568,310, dated Jun. 12, 2015.
U.S. Appl. No. 14/568,310, filed Dec. 12, 2014.
U.S. Appl. No. 14/644,234, filed Mar. 11, 2015.
Mark 7 Reloading: "Mark 7 Reloading™—On Shot Show RV 2015," published Apr. 23, 2015 [online] [retrieved on Feb. 24, 2016]. Retrieved from the Internet: https://www.youtube.com/watch?v=1Rx--0v8zrA.
International Search Report and Written Opinion for App. Ser. No. PCT/US2015/063162, dated Mar. 2, 2016, 13 pages.

* cited by examiner

CARTRIDGE RELOADING IMPROVEMENTS

CLAIM OF PRIORITY

This application is a 371 U.S. National phase application of PCT/US2015/063162, filed on Dec. 1, 2015, which claims priority to EP Patent Application 15153471.6, filed Feb. 2, 2015 and U.S. patent application Ser. No. 14/568,310, filed on Dec. 12, 2014. The entire contents of the foregoing are hereby incorporated by reference.

BACKGROUND

This description relates to metallic cartridge reloading.

The most common calibers of metallic cartridges, for example, are 9 mm, .38 caliber, .40 caliber, and .45 caliber, and there are others.

A cartridge typically is constructed of a bullet (which is also sometimes called a projectile), a cylindrical shell (which is also sometimes called a case), a propellant (which is typically gunpowder), and a primer. Generally, the bullet is cylindrical and has a hollow, round, or flat point on one end. The other end of the bullet is flat or boat-tailed, fits the shell, and is held by the open end of the shell until the bullet is fired.

The other end of the shell is formed to have a washer-shaped round rim. The hole in the center of the rim houses the primer. In use, the cartridge is held within the chamber of the firearm. When the bullet is discharged by a pin impacting the primer (each time the trigger of the firearm is pulled), the firearm can eject the spent cartridge and (in the case of semiautomatic operation) loads another, fresh cartridge into the chamber of the firearm.

Machines called reloaders (or reloading presses) are used to process spent cartridges for reuse. When the cartridges have been reloaded, they include fresh bullets, propellants, and primers. It is the shells that are reused; the other components of the cartridge must be replaced, methodically and precisely. A sequence of several steps is involved in reloading a spent cartridge. The sequence must be followed carefully in order to produce a usable, reloaded cartridge safely.

A reloader may include several processing stations arranged at fixed positions in a circle or a line. At each of the processing stations, one of the steps of the sequence is performed. As the shell is being subjected to each of the steps at the respective processing stations, other shells are typically being processed simultaneously to complete other steps of the sequence at the other processing stations.

The processing of shells occurs in a succession of processing cycles. Each of the cycles includes a processing segment and a relocating segment. During the processing segment of each of the cycles, each of the shells is located at a stationary position at one of the processing stations where the steps of the reloading are performed. During the relocating segment of each cycle that follows the processing segment, all of the shells are moved simultaneously to the next stations. To do this, some reloaders include a rotating shell plate that holds the cartridges that are being processed. During the processing segment of each cycle, a spent shell is placed at a first processing station of the reloader and at other stations the shell is restored back to original specifications, propellant is added, a new primer is added, a bullet is added, and the shell is crimped to hold the bullet in place. After the processing segment of the cycle has been completed, and as the relocating segment of the cycle proceeds, the reloaded cartridge that was being processed at the final processing station is ejected from the reloader. At some of the processing stations, some of the steps can be performed manually or automatically or a combination of both.

Depending on the duty cycle (duration) of the processing cycles, a variable number of cartridges can be reloaded in an hour, for example. The timing of the segments of, and the total duration of, the duty cycle is subject to the capabilities of the machine and the operator.

Additional information about reloaders, their construction, and how they are operated, can be found on the World Wide Web at various sites, including videos found on YouTube.

A number of manufacturers offer reloaders on the commercial market. One such reloader is the Dillon Super 1050. (See http://www.dillonprecision.com/#/content/p/9/pid/26048/catid/1/Super_1050_220_Volt, for example.) The Dillon Super 1050 is equipped with a hand crank that controls the processing cycles, drives the rotating shell plate around the central axis, and drives mechanical elements at the various processing stations that perform processing steps involved in the reloading.

Some of the processing steps in the reloading sequence require a force to be applied by a die (known as a reloading die) to the cartridge being reloaded. In the Dillon Super 1050, each of the processing stations may include a die mounted in a fixed position relative to the central axis. The dies, which are used to apply the forces to the cartridges, are mounted on a round die support positioned above the shell plate. During processing, the round die support holding the dies moves up and down relative to the stationary shell plate that holds the cartridges being processed. The processing segment of each processing cycle begins with the die supported at its uppermost position relative to the shell plate. During the processing segment, the die support is forced downward towards the stationary shell plate so that the dies can apply their forces to the cartridges, until the die support reaches a lowermost position at which the processing steps are completed. Then the die support returns upward to its original, uppermost position. During the later portion of the upward motion of the die support, the relocating segment begins, and the shell plate is rotated to its next position.

When the Dillon Super 1050 is being operated manually, a crank is moved back and forth from a starting position by the operator during each of the processing cycles. One end of the crank is attached to a rotating drive cylinder that is mounted eccentrically on the reloader to drive (through mechanical linkages) the upward and downward motion of the die support. The eccentric mounting is arranged to correspond to the uppermost position and lowermost position of travel of the die support. During a processing cycle the user pushes the crank back and forth to rotate the drive cylinder. The crank begins its motion in a position corresponding to the uppermost position of the die support. As the crank is pulled forward mechanical components of the reloader push the round die support down against the cartridges to perform the processing steps at each of the processing stations, simultaneously. When the crank reaches its forward-most position, the die support reaches its lowermost position. And, as the crank is moved back towards its original position, the die support is returned to its uppermost position and the mechanical linkages also cause the shell plate to rotate to its next position, so that all of the cartridges being processed are moved to the next processing stations.

The die support, the dies, the rotating shell plate and the mechanisms that cause the up and down motion of the round die support relative to the rotating shell plate and the rotation of the shell plate relative to the central axis are together called the reloader press or simply the press.

SUMMARY

In general, in an aspect, a digitally controlled actuator has a connector for coupling to a drive mechanism of an existing hand-driven cartridge reloader, to actuate a series of processing cycles of the reloader in which supplies of components are subjected to successive mechanical processing steps to produce reloaded cartridges ready for use. There are sensors associated with the actuator and the reloader to (a) acquire digital information that is indicative of a state of progress of each of the processing cycles and of conditions of the reloader related to the production of the reloaded cartridges, and (b) deliver the digital information to a digital controller for controlling the processing cycles of the reloader. The digital controller is connected to receive the digital information from the sensors and to control automatic operation of the reloader in successive processing cycles to produce reloaded cartridges without requiring human intervention.

Implementations may include one or any combination of two or more of the following features. The actuator includes a servo motor. The drive mechanism of the reloader includes an eccentrically rotating input shaft, the actuator includes a circularly rotating output shaft, and the connector is configured to enable the circular rotation of the output shaft to drive the eccentrically rotating input shaft of the reloader. The digital controller controls automatic operation of the controller by controlling a profile of motion of the actuator during each of the processing cycles. The motion profile includes a speed profile. The sensors provide digital information indicative of the start or end of each of the processing cycles. The sensors provide digital information indicative of the depletion of supplies of components used in the production of the reloaded cartridges. The components include at least one of: cartridges, primers, powder, or bullets. The automatic operation of the reloader is interrupted automatically when an alarm condition occurs. The alarm condition includes an inadequate supply of a component used in the reloading or a failure of one of the processing steps to be completed correctly. There is a user interface coupled to the controller to provide information to the user about operation of the reloader and to enable the user to provide commands and parameters to the controller.

The digital controller controls a dwell period of the reloader during a portion of each of the processing cycles. The dwell period occurs at the end of each of the processing cycles as the reloader moves cartridges to new stations at which processing steps are performed. The reloader has a support for cartridges to be reloaded. The support is movable to index the cartridges to precise positions at successive processing stations of the reloader, between processing steps of the reloading. The controller controls the actuator to drive the reloader in a mode for indexing the cartridge that is different from a mode for the processing steps. The indexing mode includes a speed of operation slower than the speed of operation of the processing steps. The controller controls the actuator to transition from the indexing mode to the processing mode gradually to improve a precision of the indexing.

The profile spans an entire processing cycle of the cartridge reloader. The profile is predetermined. A user can select the profile from among a set of profiles. The profile includes a duty cycle of the processing cycle. The profile includes at least one of position, speed, or acceleration. The profile includes a portion applicable to an indexing of the support to the successive processing stations. There is a resilient timing belt between the actuator and the reloader to smooth driving of the reloader by the actuator. The sensors include optical sensors that are added to the existing hand-driven reloader. The actuator includes a servomotor and a gear reduction device to couple the servomotor to the reloader.

In general, in an aspect, an actuation of a drive mechanism of an existing hand-driven cartridge reloader is digitally controlled, to actuate a series of processing cycles of the reloader in which supplies of components are subjected to successive mechanical processing steps to produce reloaded cartridges ready for use. Digital information is received from sensors that indicates a state of progress of each of the processing cycles and of conditions of the reloader related to the production of the reloaded cartridges. The digital information is used to control automatic operation of the reloader in successive processing cycles to produce reloaded cartridges without requiring human intervention.

Implementations may include one or any combination of two or more of the following features. The digital information is used to control automatic operation of the reloader including controlling the speed profile of the reloader within each of the processing cycles. A user is alerted through a user interface of conditions associated with the reloader based on the digital information received from the sensors. An alarm is sent to the user or the reloader is stopped the based on the digital information received from the sensors. An emergency kill switch enables a user to immediately stop operation of the reloader.

In general, in an aspect, an apparatus includes an actuator to drive a cartridge reloader that has a support for cartridges to be reloaded. The support is movable to index the cartridges to precise positions at successive processing stations of the reloader, between processing steps of the reloading. A controller controls the actuator to drive the reloader in a mode for indexing the cartridge that is different from a mode for the processing steps.

Implementations may include one or a combination of two or more of the following features. The indexing mode includes a speed of operation slower than the speed of operation of the processing steps. The actuator is controlled to transition from the indexing mode to the processing mode gradually to improve a precision of the indexing.

In general, in an aspect, an apparatus includes a controllable actuator to drive a cartridge reloader that has a support for cartridges to be reloaded. The support is movable to successive processing stations of the reloader. A controller is programmed to control driving of the cartridge reloader in accordance with a profile of motion.

Implementations may include one or a combination of two or more of the following features. The speed profile spans an entire processing cycle of the cartridge reloader. The speed profile is predetermined. A user can select the speed profile from among a set of speed profiles. The speed profile includes a duty cycle of the processing cycle. The speed profile comprises at least one of position, speed, and acceleration. The speed profile includes a portion applicable to an indexing of the support to the successive processing stations.

In general, in an aspect, an apparatus includes a controllable actuator to drive a cartridge reloader that has a support for cartridges to be reloaded. The support is movable to successive processing stations of the reloader. A resilient timing belt between the actuator and the reloader smooths the driving of the reloader by the actuator.

In general, in an aspect, an apparatus includes a controllable actuator to drive a cartridge reloader that has a support for cartridges to be reloaded. The support is movable to successive processing stations of the reloader A mechanism automatically causes a dwell in driving the shell plate as the plate is indexed to a next processing station.

In general, in an aspect, an apparatus includes a controllable actuator to drive an eccentrically rotating drive shaft of a cartridge reloader that has a support for cartridges to be reloaded. The support is movable to successive processing stations of the reloader. The controllable actuator has a circularly rotating drive shaft and an eccentrically rotating coupling between the drive shaft of the actuator and the drive shaft of the reloader.

In general, in an aspect, an apparatus includes a graphical user interface for an actuator for a cartridge reloader that has a support for cartridges to be reloaded. The support is movable to successive processing stations of the reloader. The graphical user interface is controllable to display a number of aspects of reloading including but not limited to: the speed of the actuator and to display quantities of components to be used in reloading cartridges on the reloader.

In general, in an aspect, an apparatus includes optical or mechanical sensors or both held in positions relative to locations of cartridges being reloaded on a cartridge reloader and configured to provide signals indicative of dwell locations of the reloader.

In general, in an aspect, an apparatus includes a servomotor to drive a cartridge reloader, and a gear reduction device to couple the servomotor to the cartridge reloader.

In general, in an aspect, an apparatus includes a kit to automate operation of a cartridge reloader that has a support for cartridges to be reloaded. The support is movable to successive processing stations of the reloader. The kit includes an actuator to actuate a drive shaft of the reloader, and a controller programmed to control driving of the cartridge reloader in accordance with a profile of motion.

These and other aspects, features, implementations, and advantages, and combinations of them can be expressed as apparatuses, methods, systems, components, program products, and means or steps for performing functions, and in other ways, These and other aspects, features, implementations, and advantages, and combinations of them, will become apparent from the following description (including the figures) and the claims.

DESCRIPTION

FIGS. 9, and 14 through 18 are views of a user interface.

Figure 10:
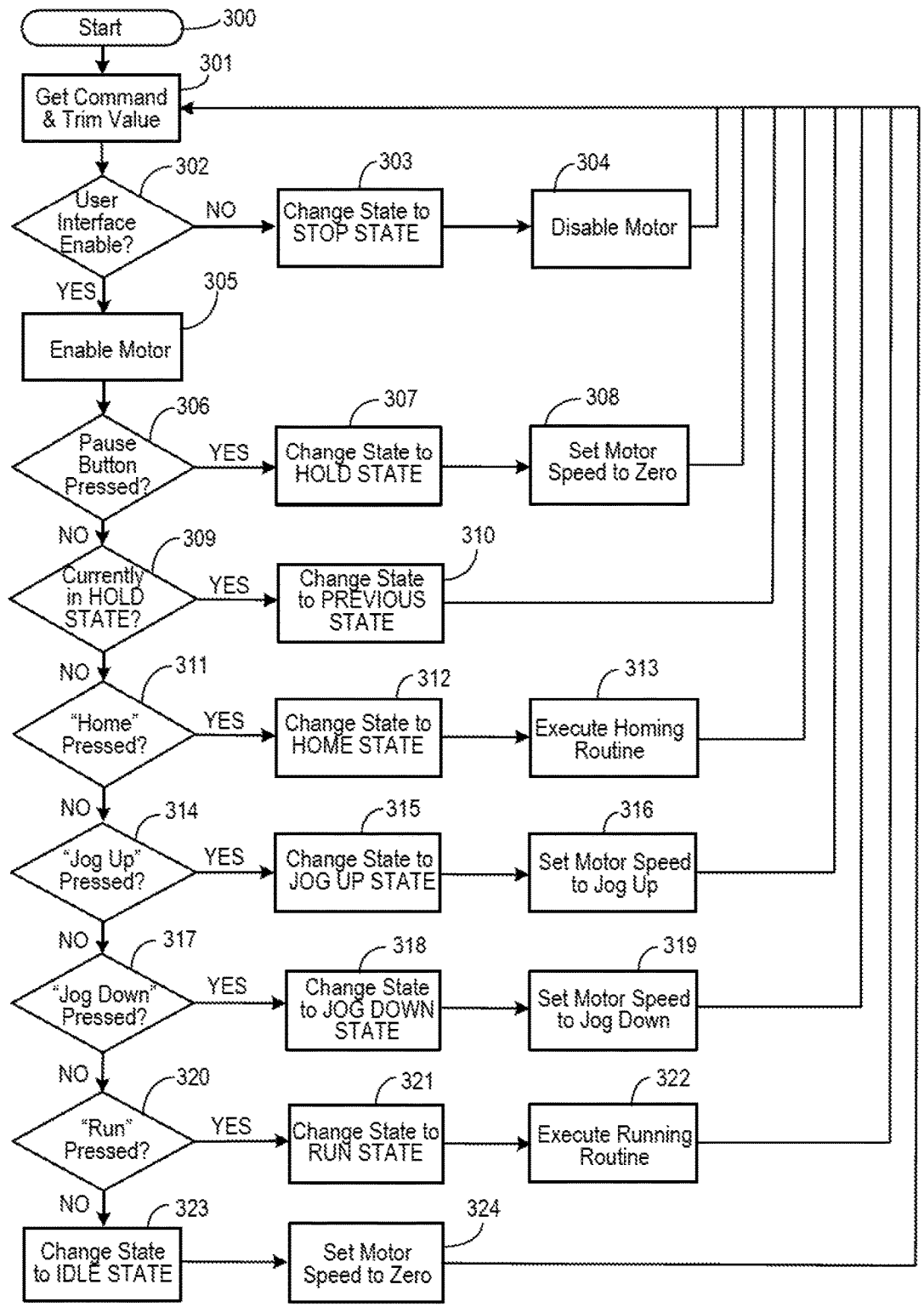
Figure 11:
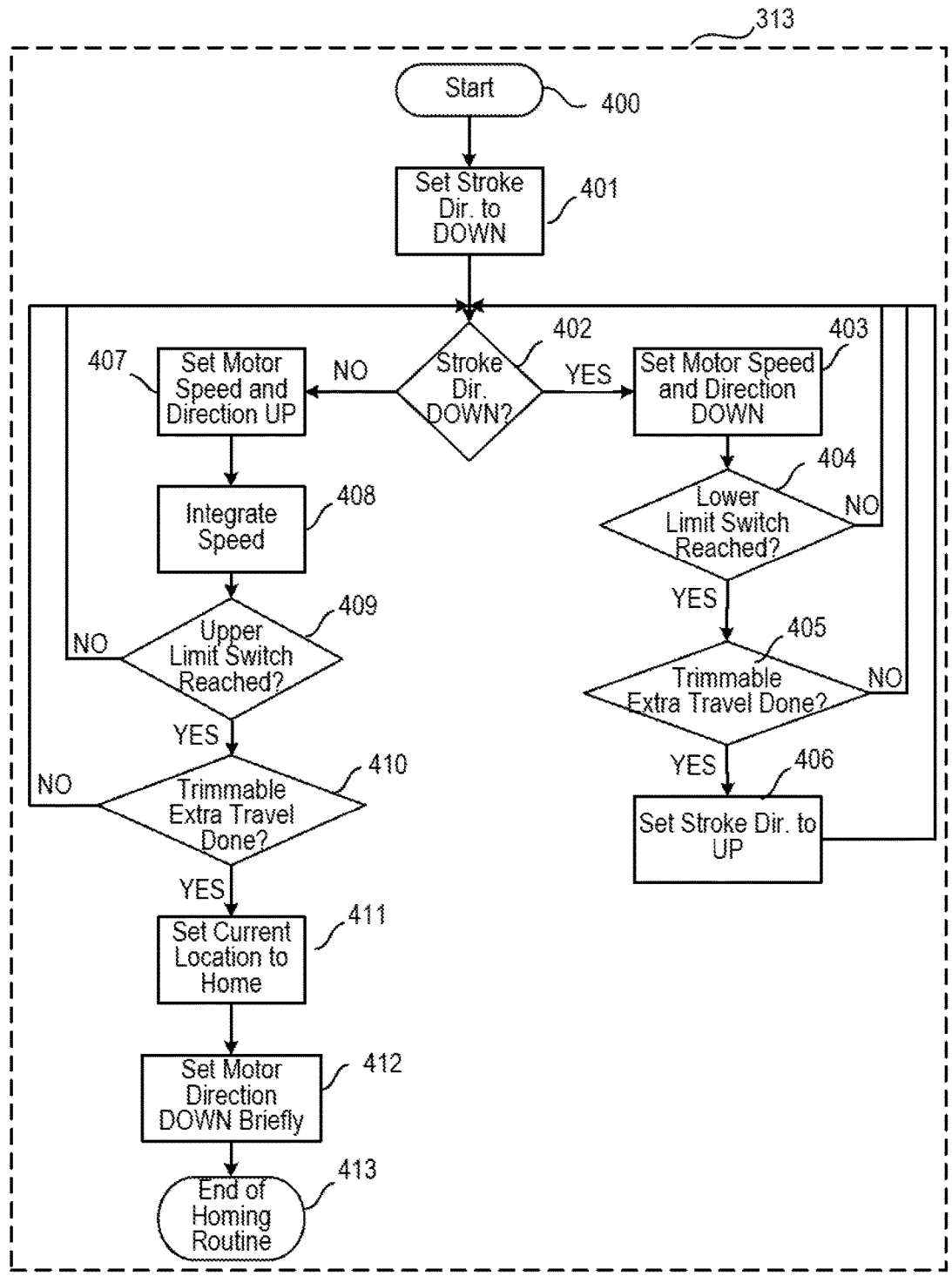
Figure 12:
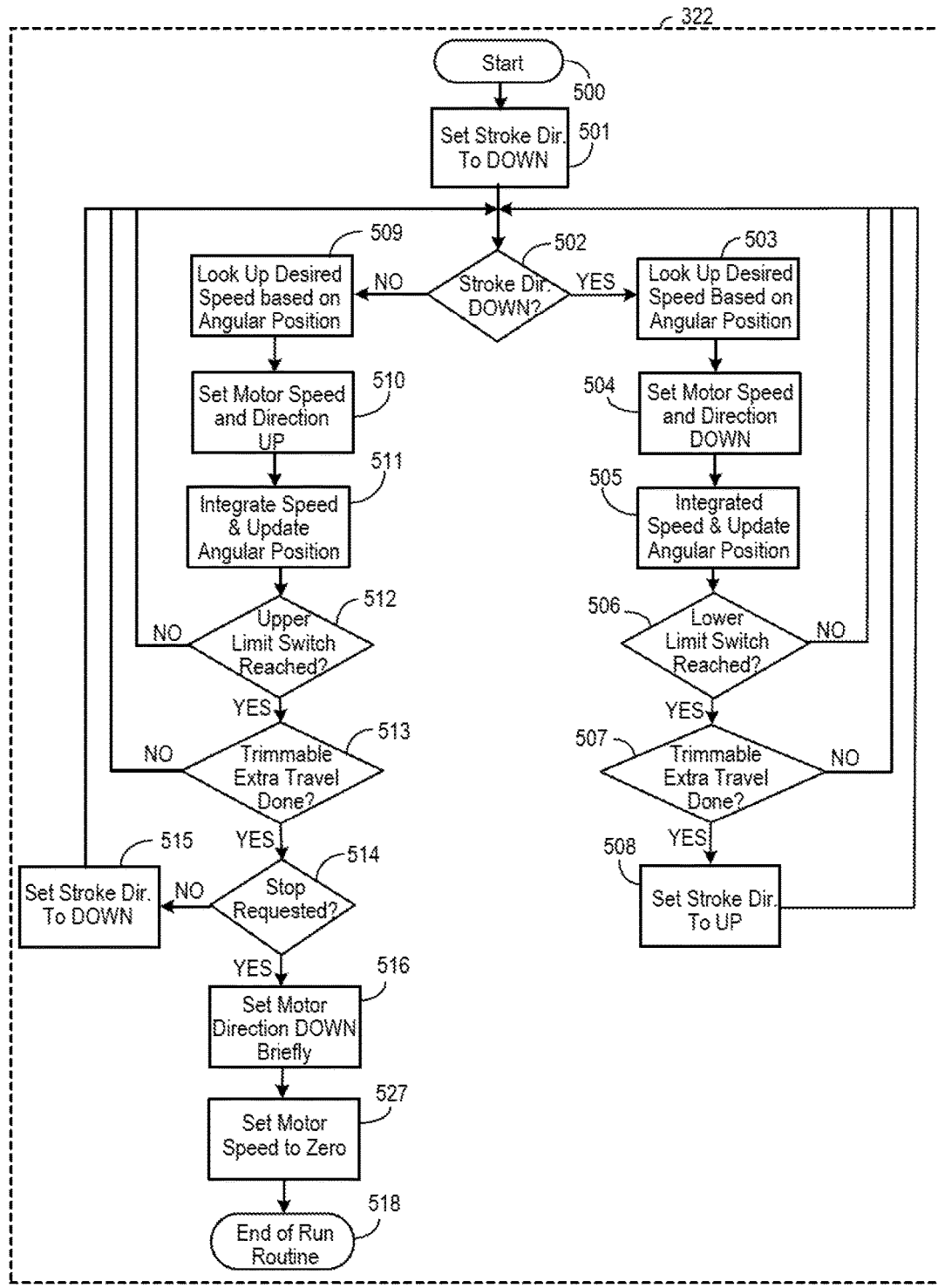

FIGS. 10, 11, and 12 are flow diagrams.

Figure 13:
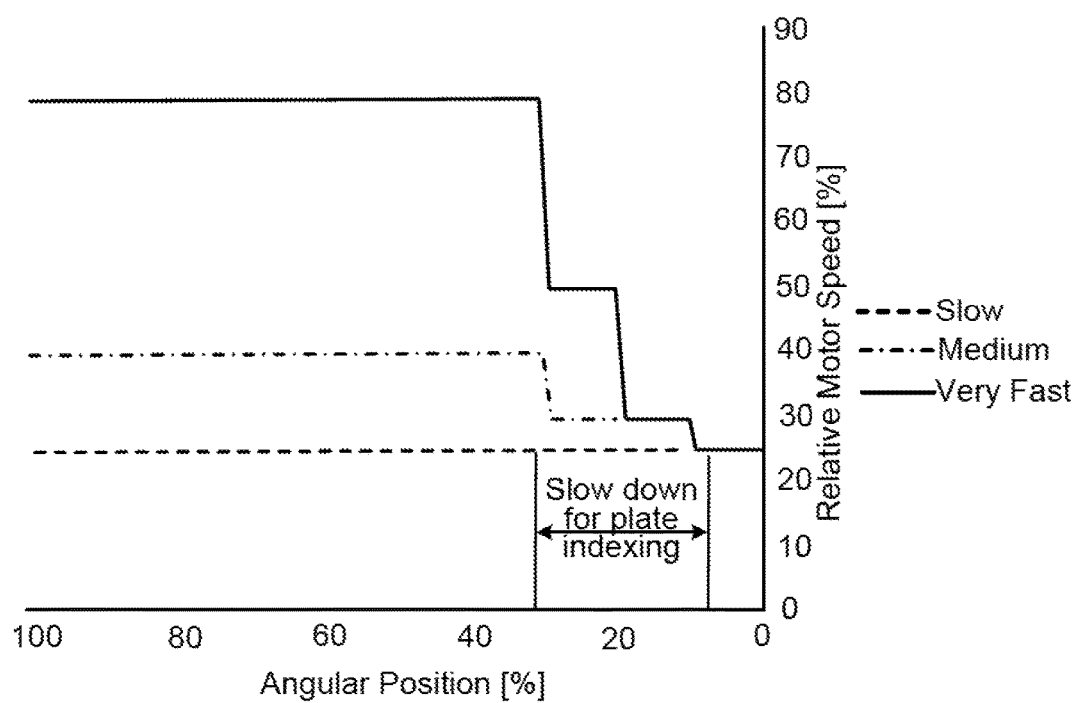
Figure 14:
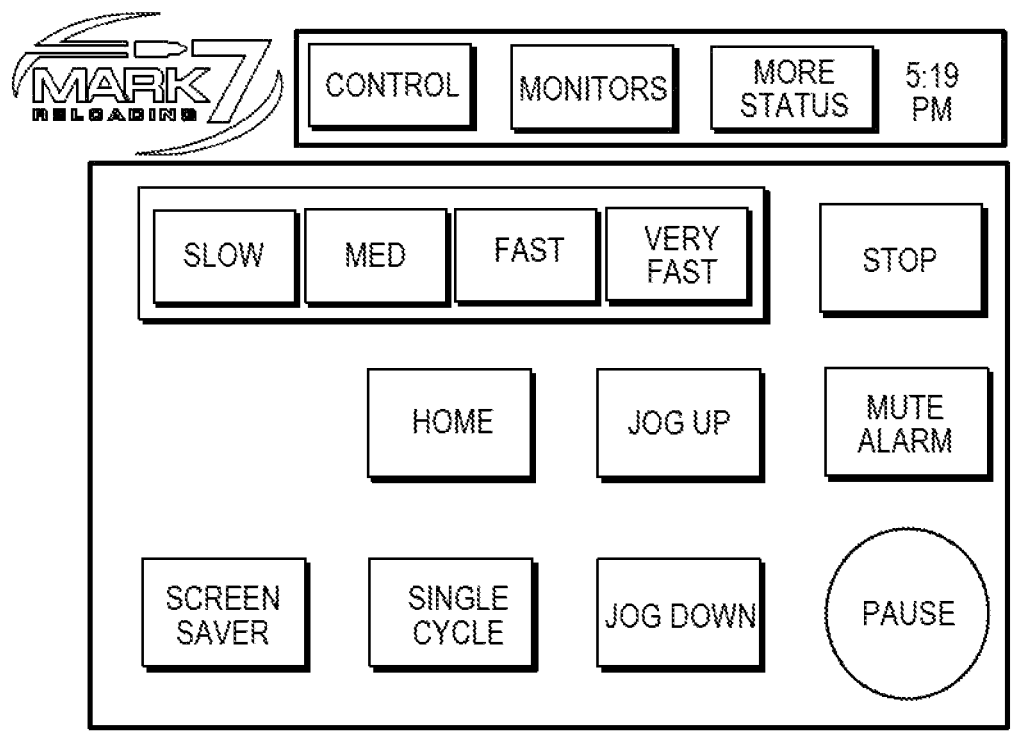
Figure 15:
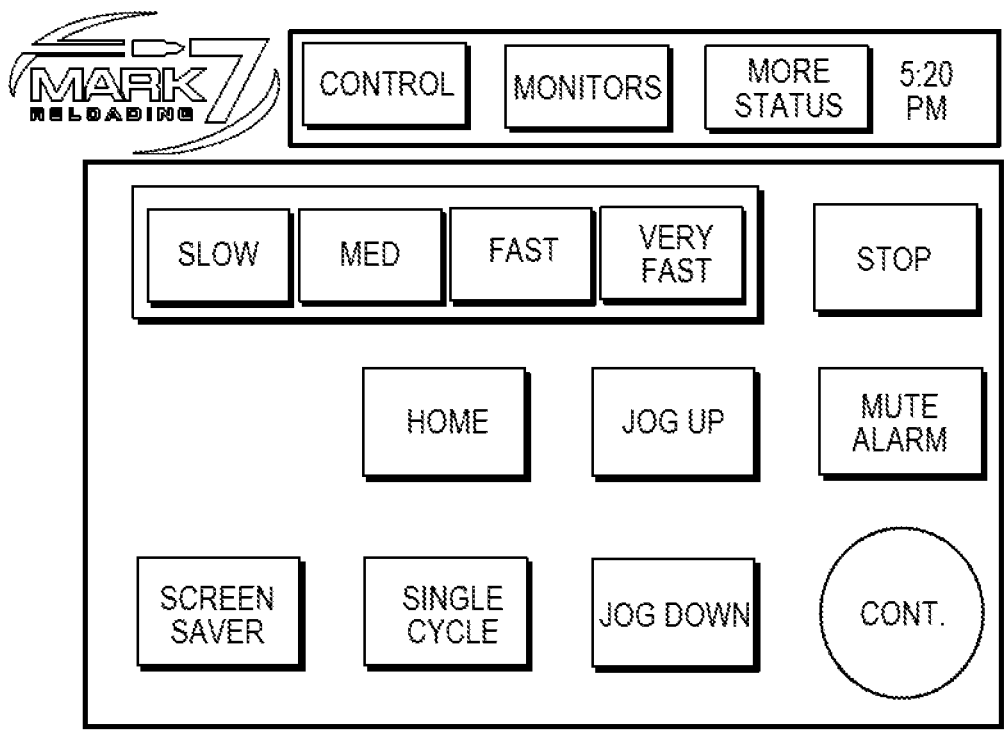

FIG. 13 is a graph of speed versus position.

Here we describe improvements in the design, construction, operation, and use of cartridge reloaders. In some implementations of the techniques and equipment that we describe, the improvements are useful as add-on components for existing commercially available cartridge reloaders, for example, the Dillon Super 1050 cartridge reloader available from Dillon Precision Products, Inc., 8009 East Dillon's Way, Scottsdale, Ariz. 85260 U.S.A.

By add-on, we mean, for example, that the components can be connected to and disconnected from the existing cartridge reloader repeatedly without damaging the cartridge reloader or the components and without requiring any changes (or any substantial changes) to the existing cartridge reloader.

In some implementations, the improvements could be entirely or partially built into the design of an existing cartridge reloader and incorporated in the construction of the reloader (we sometimes use the word reloader interchangeably with the phrase cartridge reloader).

Although we sometimes refer to the Dillon Super 1050 reloader in our discussion as an example, the techniques and devices that we describe here are useful with other brands and kinds of reloaders as well.

Figure 1:
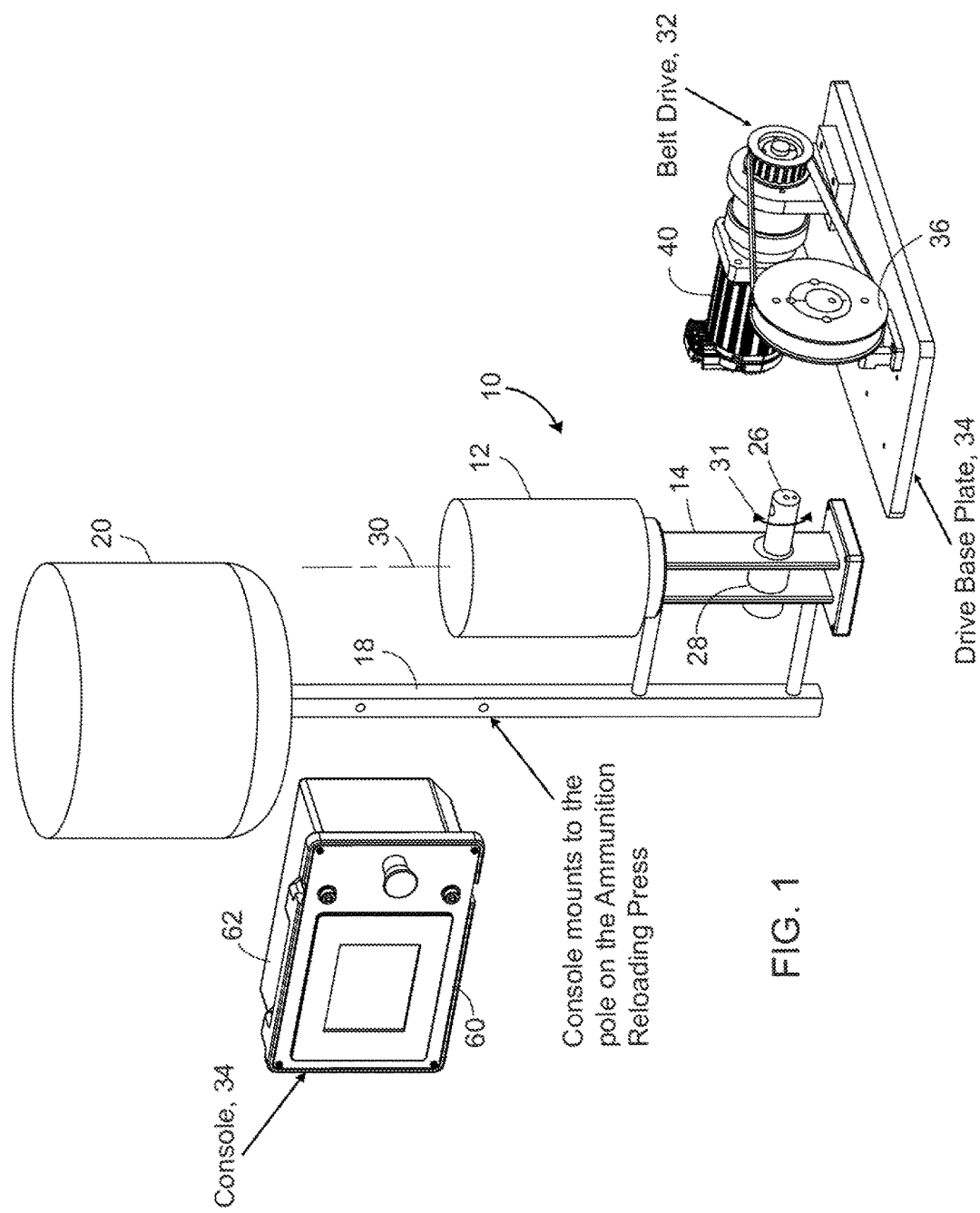
FIG. 1 is an isometric assembly view of a reloader, a console, and a drive belt.

As shown schematically in FIG. 1, the reloader 10 includes a cartridge reloading press 12 (the details of which are not shown), a stand 14 to support the press, a pole 18, a container 24 of spent shells on the pole to be used in the reloading process, and a cylindrical input shaft 26 coupled eccentrically to a cylindrical rotating drive shaft 28 that can rotate freely within bearings mounted on the stand 14. A crank handle (not shown) can be mounted at one end on the end of the input shaft 26. The crank handle can be rotated back and forth to cause the input shaft 26 to rotate 30 to drive the operation of the reloader. Rotating the input shaft 26 drives a crank (not shown) that is mounted on drive shaft 28. A linkage (not shown) connects the crank to the press's main actuator (not shown) and translates the reciprocating rotary motion 31 of the drive shaft into up and down motion of the main actuator. The input shaft is configured to rotate eccentrically, and an eccentric coupling couples a belt drive 32 to the input shaft 26 to "neutralize" the eccentric motion of the input shaft so that the driven sprocket can rotate on a fixed axis to maintain constant belt tension. It is important that, at the end of the relocation segment of each processing cycle, the cartridges occupy their intended positions very precisely so that when the tools are pressed against the cartridges in the next processing cycle, the processing steps are performed accurately and completely. We call the relocation of the shell plate in each cycle to reach the precise intended position, an indexing phase (or simply indexing).

The improvements to the reloader that we describe here include a belt drive 32 and a console 34. The belt drive and the console are shown separated from the reloader in FIG. 1, but during operation they are attached to the reloader. The console is also connected to a power source and to sensors and actuators on the reloader and on the belt drive.

The reloader is mounted on a base plate 34 of the belt drive and the end of the input shaft 26 couples to a drive wheel 36 of the belt drive as explained below. The console 34 is mounted on the pole 18. The belt drive includes an electric servo motor 40 (powered from, for example, a wall socket).

Figure 2:
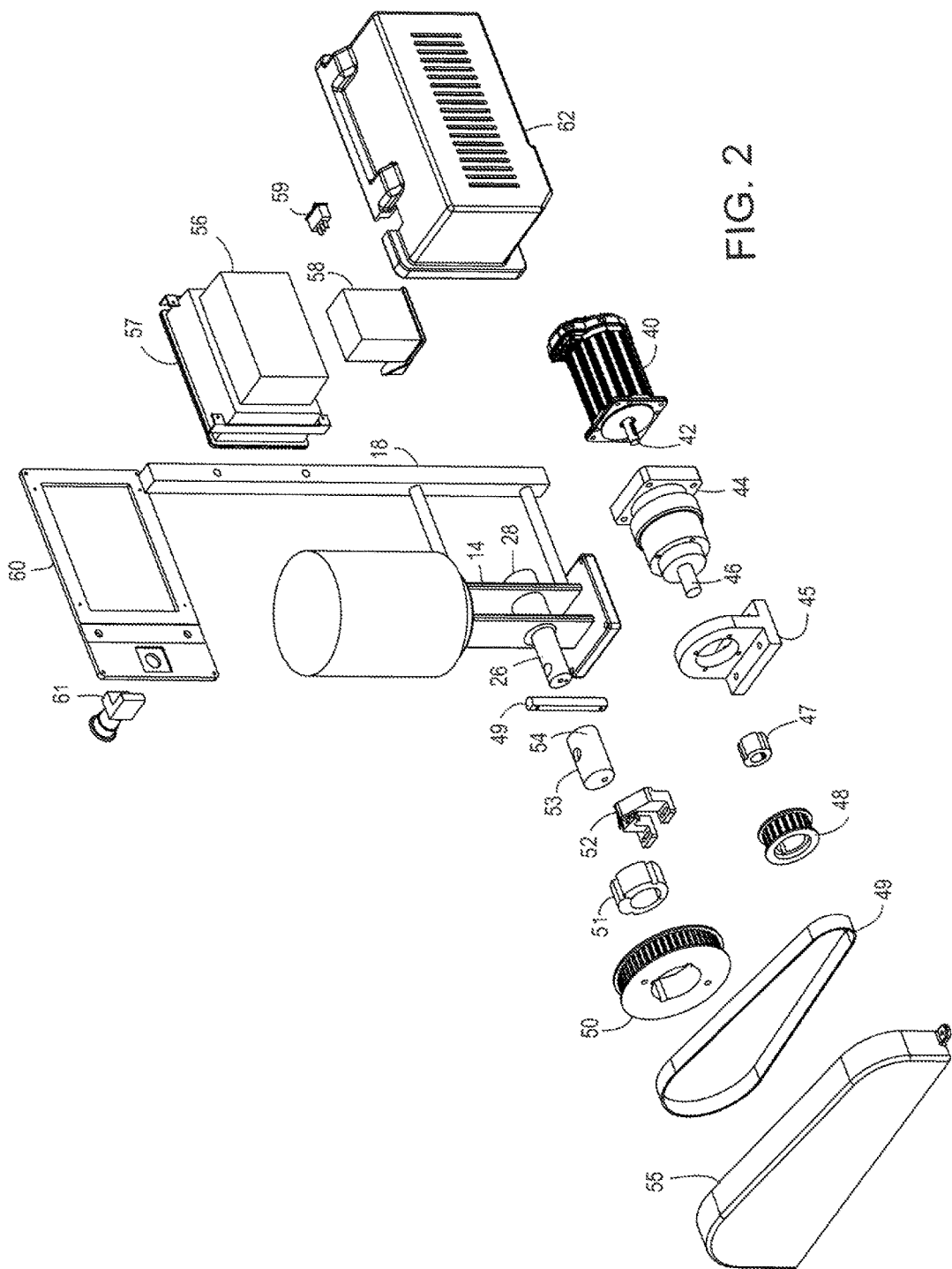
FIG. 2 is an exploded isometric view of a reloading system.

FIG. 2 shows additional detail (in an exploded view) of parts of the console and the belt drive.

In the belt drive, a shaft 42 of the servo motor is coupled to a gear reducer 44. The gear reducer and the motor are supported on a mount 45 that is bolted to a base plate (not shown) of the belt drive. A sprocket 47 is mounted tightly on the shaft 46 and fits within a belt sprocket-to-shaft adapter 48. A timing belt 49 engages teeth of the belt sprocket 48 and also engages a larger belt sprocket 50. A larger, eccentric sprocket-to-shaft adapter 51 fits within the belt sprocket 50 and over a shaft adapter 53. A position sensor 52 is mounted on the base plate of the belt drive and cooperates with an outer surface 54 of the shaft adapter to sense when the angular position of the shaft adapter 53 corresponds to the uppermost and lowermost positions of the tool support (we sometimes use the phrase "die support" interchangeably with the phrase "tool support". The position sensor 52 communicates with the console 34 to enable the console to control precisely the motion of the drive shaft 28 by directing the operation of the motor 40. A belt guard 55 is mounted on the base plate of the belt drive to shield the timing belt.

As also shown in FIG. 2, the digital console contains electronics that include a microcontroller 56, an LCD touchscreen display 57 including an associated programmable logic controller, a power supply 58 with an on-off power switch 59, and an emergency kill switch 61. The electronics are held within and on a console rear cover 62 and a console front plate 60.

Figure 4:
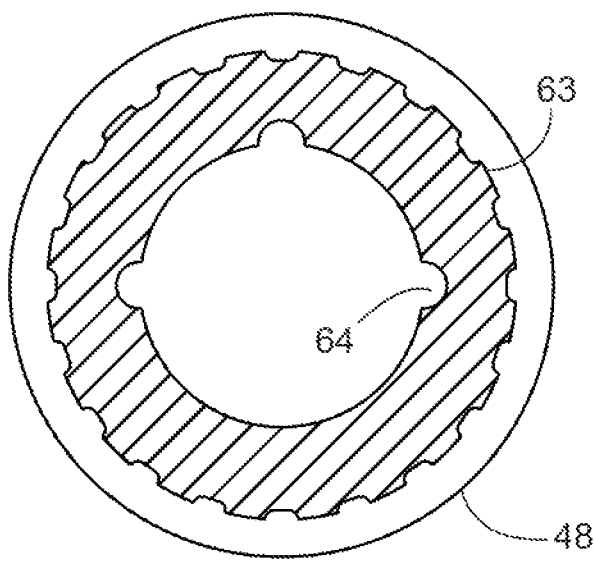
FIG. 4 is a cross-sectional view of a motor sprocket.
Figure 5:
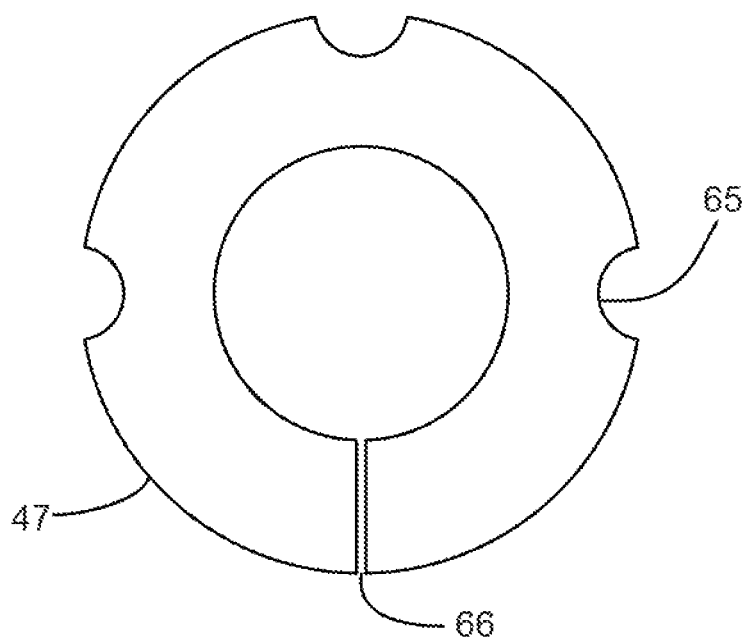
FIG. 5 is a front view of an adaptor.

As shown in cross section in FIG. 4, the belt sprocket 48 has teeth 63 arranged around its periphery to engage with corresponding teeth in the flexible timing belt 49. As shown in FIG. 5, the adapter 47 is wedge shaped and has a split 66 in its circumference that permits it to be tightened by two set screws (not shown) that force fit it into the sprocket and onto the shaft 46 of the gear reducer 44 to achieve a tight fit. In implementations that include electronic torque control, the sprocket can be keyed to the output shaft of the gear reducer using the slots 65 of the adapter and the slots 64 of the gear reducer. After the adapter is attached to the shaft of the gear reducer, the drive sprocket is mounted on the adapter with the slots 65 aligned with the slots 64.

The belt sprocket 50 is similar to the belt sprocket 48, but larger in diameter, and it is attached to the eccentric sprocket-to-shaft adapter in a similar way. The eccentric sprocket of the sprocket eccentric adapter 51 converts circular rotation of the belt sprocket 50 into the minor eccentric rotation of the input shaft of the reloader in order to permit a constant distance to be maintained between belt sprockets 48 and 50. The adaptor 51 is similarly mounted on one end of the shaft extension adapter 53 and held by connector link bar 49.

Figure 6:
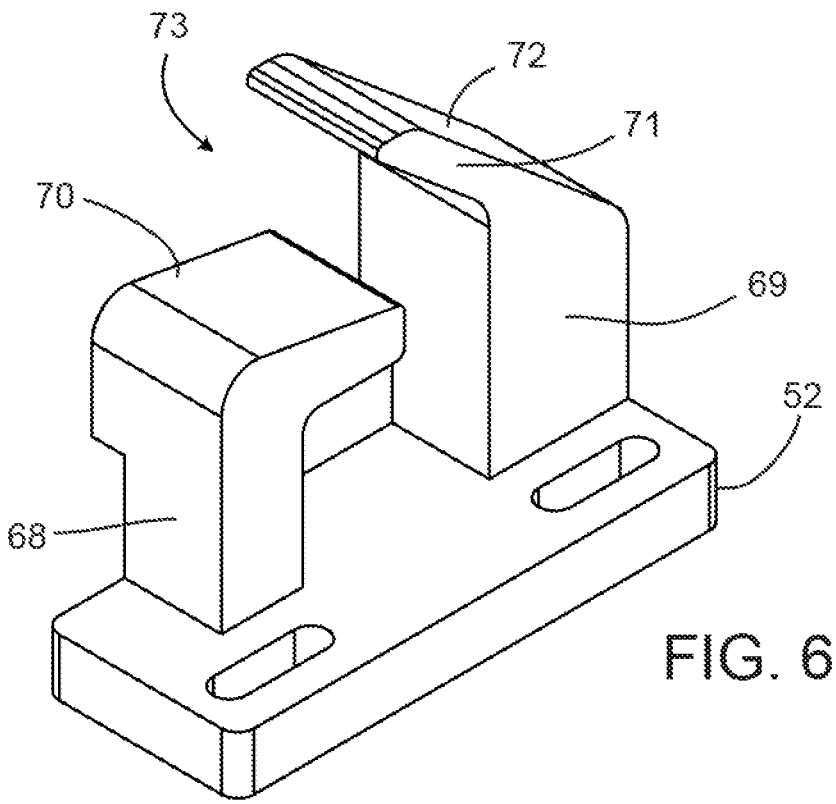
FIG. 6 is a mount for a position sensor.

FIG. 6 shows the position sensor mounting bracket 52, which is formed of ABS plastic. The mounting bracket 52 has two separate fingers 68 and 69. Position sensors are mounted on the top surface 70 of the finger 68 and the top surface 72 of finger 71. When the belt drive has been assembled, and during operation, the connector link bar rotates through an arc of approximately 170 degrees. At the extremes of its motion it triggers the position sensors and thus conveys the angular position of the input shaft to the drive controller electronics.

Figure 7:
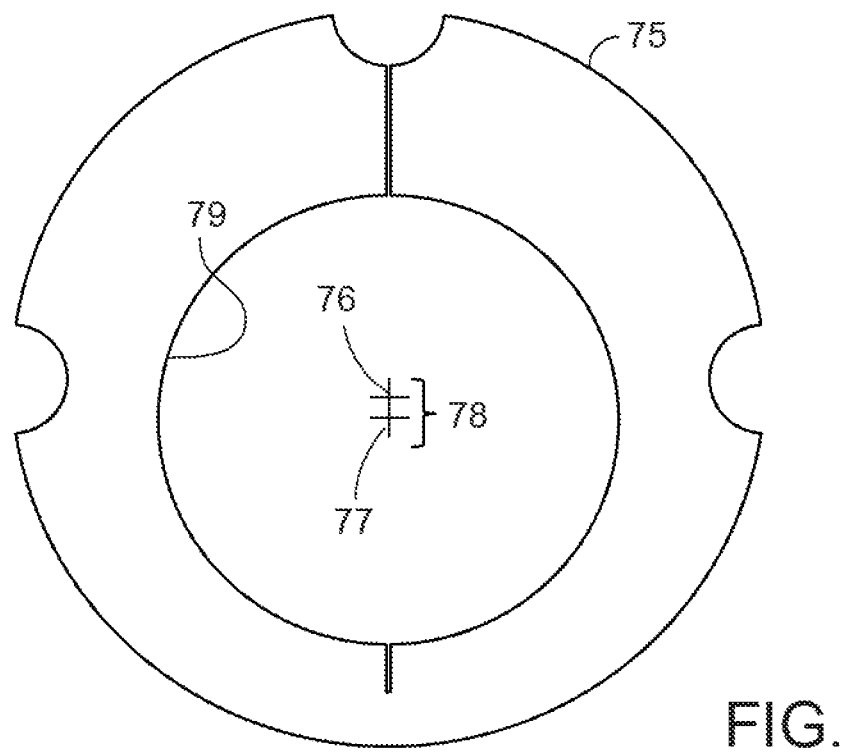
FIG. 7 is a front view of an eccentric adaptor.

As shown in FIG. 7, the eccentric adapter has a cylindrical outer surface 75 centered on an axis 76 and has an inner cylindrical surface centered on an axis 77. Because of the separation 78 between the two axes 76 and 77, the adapter moves eccentrically when rotated around the axis 76, that is, the axis 77 of the inner surface 79 will rotate around the axis 76.

Figure 3:
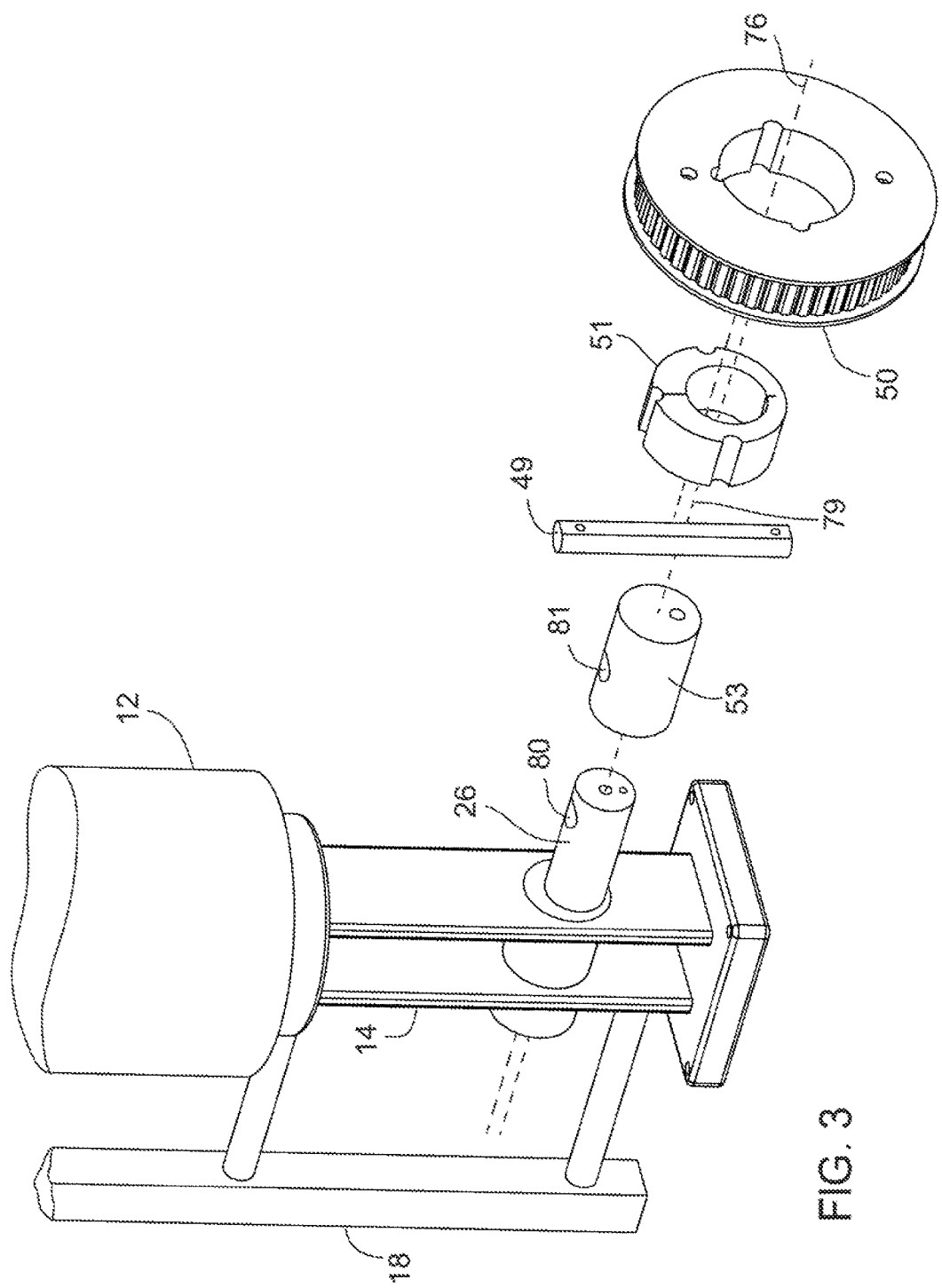
FIG. 3 is an enlarged exploded view of a portion of the reloading system.

FIG. 3 provides a larger scale view of the coupling between the belt drive and the reloader and shows how the eccentric adapter 51 operates relative to the input shaft 26 to enable the belt sprocket 50 to rotate non-eccentrically while it drives the eccentric input shaft 26 and in turn the reloader.

The input shaft 26 has a hole 80 that extends through the rod and typically would receive an end of the manual crank used to drive the reloader. The adapter 53 is cylindrical and has an axial bore (not seen in FIG. 3) of a diameter slightly larger than the outer diameter of the input shaft 26.

To connect the belt drive to the reloader, the belt drive can be moved into a position in which the adapter 53 surrounds a portion of the input shaft 26 and the hole 80 is aligned with two corresponding radially aligned holes 81 in the adaptor (only one is seen in FIG. 3). A connector link bar 49 (also called a torque rod) is then mounted through the holes and securely fastened to sprocket 76 using screws (not shown) that extend through the two holes in the face of sprocket 76 and thread into the two corresponding holes in the link bar 49. The reloader is then bolted securely to the belt drive. The link bar 49 is strong enough to bear the torque applied by sprocket 76 as it is rotated back and forth and to convey that torque to the input shaft 26.

In operation, as the sprocket 50 is rotated back and forth non-eccentrically around a rotational axis 76, the axis 77 and in turn the adapter 53 and the input shaft 26 rotate eccentrically about axis 76. In other words, the adapter 51 permits the sprocket 50 to rotate non-eccentrically to drive the rod 26 eccentrically, as it was designed and built to do.

Accordingly, the belt drive provides a mechanism that enables a servo motor to drive the back-and-forth rotation of the input shaft of the reloader.

The combination of the microcontroller, signals from the position sensor and other sensors, and the servo-motor and other actuators (among other things) enable automated, complex, and subtle control of the speed, acceleration, and angular position of the input shaft over the entire range of its rotational motion in either direction. This permits modes of operation that would otherwise be difficult to achieve by manual operation alone.

Figure 8:
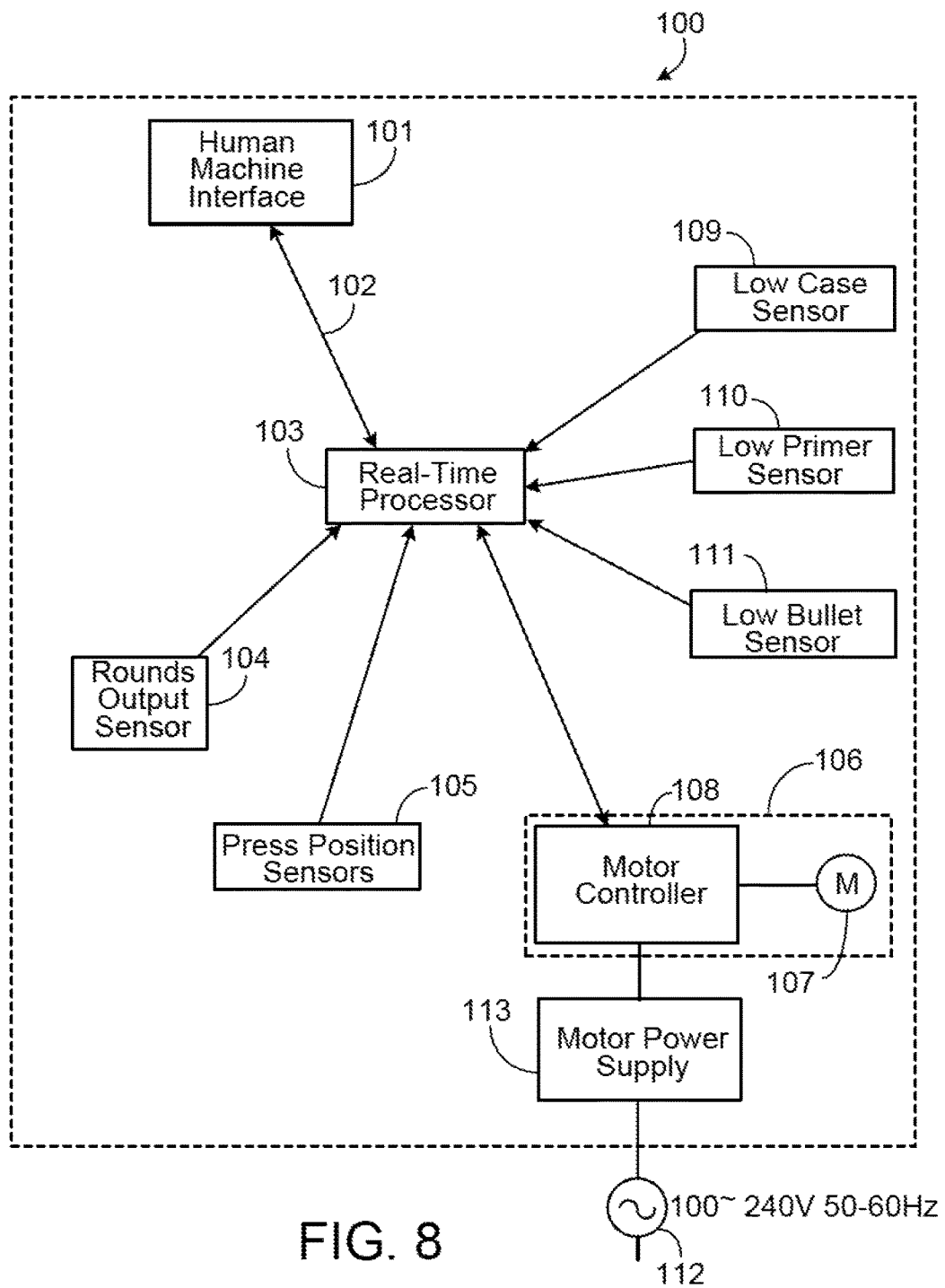
FIG. 8 is a block diagram.

A hardware overview of the system 100 that automates the operation of the reloader is shown in FIG. 8.

In some implementations, a user interacts with the system through a human machine interface (HMI) 101 such as the HMI of an integrated HMI and programmable logic controller (PLC) (such as the integrated HMI and PLC of the EZ TouchPLC Nano available from EZAutomation of Bettendorf, Iowa). The integrated HMI and PLC is housed in the console 34 identified in FIG. 1.

The HMI includes a touch-sensitive display screen that provides information to and receives touched inputs from a user, and a graphical user interface (GUI) software process that displays the information on the display screen and accepts the touched inputs of the user. The GUI process is executed by the integrated HMI and PLC device. In some cases, the HMI 101 can be provided through other hardware implementations, such as a touch-screen tablet (iPad, Android tablet, or others, for example), a smart phone, a computer, or a remote computer over a network (LAN, WAN, or Internet), among others.

As mentioned, the user can enter inputs through the GUI of the HMI 101 and receive status reports about the operation of the system 100 also through the GUI of the HMI 101. An important feature of the user interface is that the user inputs are collected and conveyed to a real-time processor 103 (implemented as, for example, a microcontroller). The real-time processor (among other things) receives signals from sensors on the reloader and the belt drive, and sends signals to control mechanical actuators of the reloader and the servo motor.

In some implementations, the real-time processor can be an ATmega2560 microcontroller, and the communication link 102 can be implemented as a custom parallel communication port, if there is a lack of standard communication ports (as is the case for the EZ TouchPLC Nano).

The communication link 102 between the HMI 101 and the real-time processor 103 only needs to have enough bandwidth and responsiveness to transfer user inputs and system status reports in real-time as perceived by a human, which means that typical machine-to-machine communication protocols will suffice.

The selection of the communication interface depends on the implementation of the HMI 101 and the real-time processor 103. For example, a USB link or an audio-data link would be suitable for a system that uses an Android tablet as the HMI 101 and a microcontroller as the real-time processor 103. A Bluetooth or a WiFi link is particularly suitable for a system consisting of an iPhone as the HMI 101 and a Bluetooth/WiFi enabled real-time processor 103. In some embodiments, the communication link may be omitted, if the real-time processor 103 can also drive a graphical user interface and includes an HMI as one of its subsystems.

During operation, the real-time processor 103 constantly polls sensors located on the reloader and on the belt drive to acquire data representing the state of the reloader and belt drive system 100. The acquired data is used in controlling actuators of the system through, for example, simple wired connections. The sensors that are polled and the data that is acquired include a tool support position from the position sensor 105 (the position sensor 52 shown in FIG. 2); alarms from alarm sensors (such as a low case sensor 109, a low primer sensor 110 and a low bullet sensor 111) system throughput (cartridges per unit time) from a cartridges output sensor 104 and spent primer sensor.

In some implementations, the sensors are not part of, but are added to, the reloader.

In addition to the sensors mentioned above, sensors can be added to processing stations of the reloader to observe the proper operation or completion of each processing step to which each of the cartridges is subjected during each cycle of the reloading process. The signals from the sensors are provided to the console where the microcontroller analyses them to determine whether an alarm should be issued or some other action be taken (such as shutting off the reloader).

For example, an optical de-capping sensor is placed under a de-capping station of the reloader to confirm that a spent (old) primer has been removed successfully from the cartridge at that station. If the optical sensor does not sense that a spent primer has been removed at the end of a processing cycle, the controller emits an audible signal or pauses the machine operation (the user is given the option of which of these actions to take).

Other optical sensors are provided that are used not only on reloading used cartridges but also on to load new cartridges.

For example, an optical cartridge resizing sensor can be placed at the station at which the cartridge shell is re-set to its factory specification size and shape. The factory specification has a certain minimal permitted tolerance. At the end of each processing cycle, if the sensor determines that the cartridge has not been successfully returned to its factory specification, the console sounds an audible alert. The tolerance levels can be set by the user.

And optical priming sensor can be placed to determine that a primer was inserted in correct position and at correct depth in each of the processing cycles. If the optical sensor does not sense this to be the case, the console sounds an audible signal or pauses the machine operation or both, depending on a user selection.

An optical bullet feed sensor can sense whether a bullet is in the correct position and ready for sizing, in each processing cycle. If the optical sensor does not sense this to be the case, the console sounds an audible signal or pauses the machine operation, depending on a selection of the user.

An optical sensor can detect that an overall intended cartridge length has been achieved, based on a pre-set overall length of the cartridge set by the user. If the optical sensor determines the cartridge is not of the user specified length, the console sounds an audible signal or pauses the machine operation, depending on a selection of the user.

An optical sensor can detect whether a correct cartridge crimp has been achieved, based on a pre-set crimp set by the user. If the optical sensor determines the crimp does not comply with the pre-set crimp, the console sounds an audible signal or pauses the machine operation, depending on a selection of the user.

In some implementations, the position sensor includes two normally-open mechanical micro-switches. One switch closes when the tool support reaches its travel limit (lowermost position) on the down stroke (closest to the rotating shell plate). The other switch closes when the tool support reaches its travel limit on the up stroke (the point at which the tool support is in its uppermost position, farthest from the rotating shell plate).

In some instances, the switches could be two optical switches; a circular shaft angle encoder could be used in place of switches as the position sensor 105.

The low case sensor 109, low primer sensor 110, and low bullet sensor 111 are all normally-open switches, mechanical or solid-state, that close when the press is running low on any of these raw materials. In some examples, the sensors 109, 110, and 111 are optical sensors that count the number of raw component parts left in raw material feeders of the reloader. In such cases, the cartridges (rounds) output sensor 104 is an optical switch that is mounted near the completed rounds bin. The switch triggers a signal pulse when another reloaded cartridge falls in front of it, allowing the sensor to count how many cartridges have been reloaded in a given amount of time.

The real-time processor 103 continuously collects all the sensor outputs and user inputs, processes them to determine a corresponding desired instant motor speed, torque, and direction and sends that information to a motor controller 108 and other actuator controllers, which is located with and controls an electric rotary machine (or motor) 107 (for example, the servo motor shown in FIG. 1). The desired motor speed, torque, and direction is referred to as a motor setpoint.

In some implementations, the motor controller 108 and the motor 107 are combined in a single off-the-shelf servo system (e.g., the ClearPath Brushless Servo System from Teknic) 106. The servo system is capable of causing the motor to run at any desired speed, direction, and torque in response to the motor setpoint.

During automatic driving of the reloader using the system 100, the real-time processor 103 sends a stream of intended motor setpoints as a pulse-width modulated signal (PWM) to the servo system and receives a stream of measured speeds of the motor as a PWM signal from the servo system.

Any AC or DC rotary machine, such as a brushless DC motor, an induction AC motor, or others, can be used as the motor 107, as long as it can receive and act on a motor setpoint received from the real-time processor through the motor controller 108.

The servo system 106 is powered by an AC-to-DC linear power supply (Teknic E3PS12-75) 113, which draws power from a single-phase household electric outlet 112. The separate power supply 113 may not be necessary, if the motor controller 108 can draw power directly from the household power grid. The motor controller 108 may require other types of the electrical power such as two or three-phase electric power.

Figure 9:
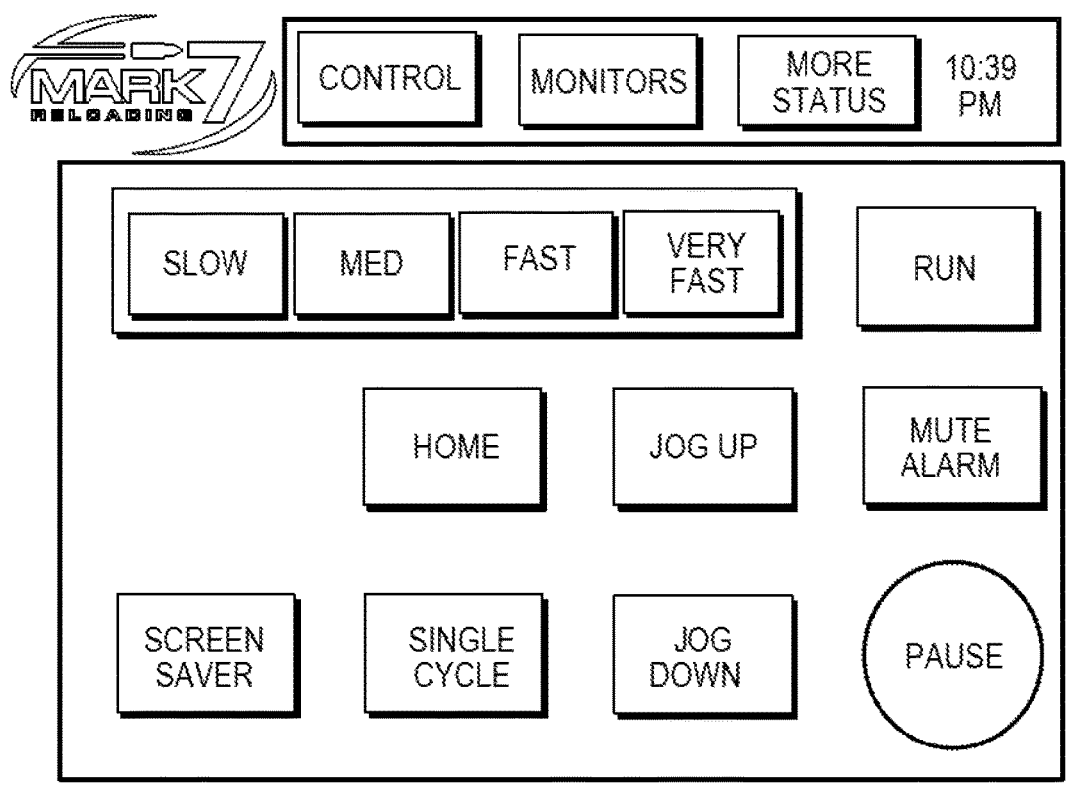

FIG. 9 shows an example of one screen of the GUI presented to the user on the HMI 101 to enable a user to manage and monitor the operation and state of the reloader. Graphical controls and information are presented on the display for the user to view. The user uses his fingers on a touch screen to tap, drag, and hold down graphic elements to send commands to the system 100.

Figure 16:
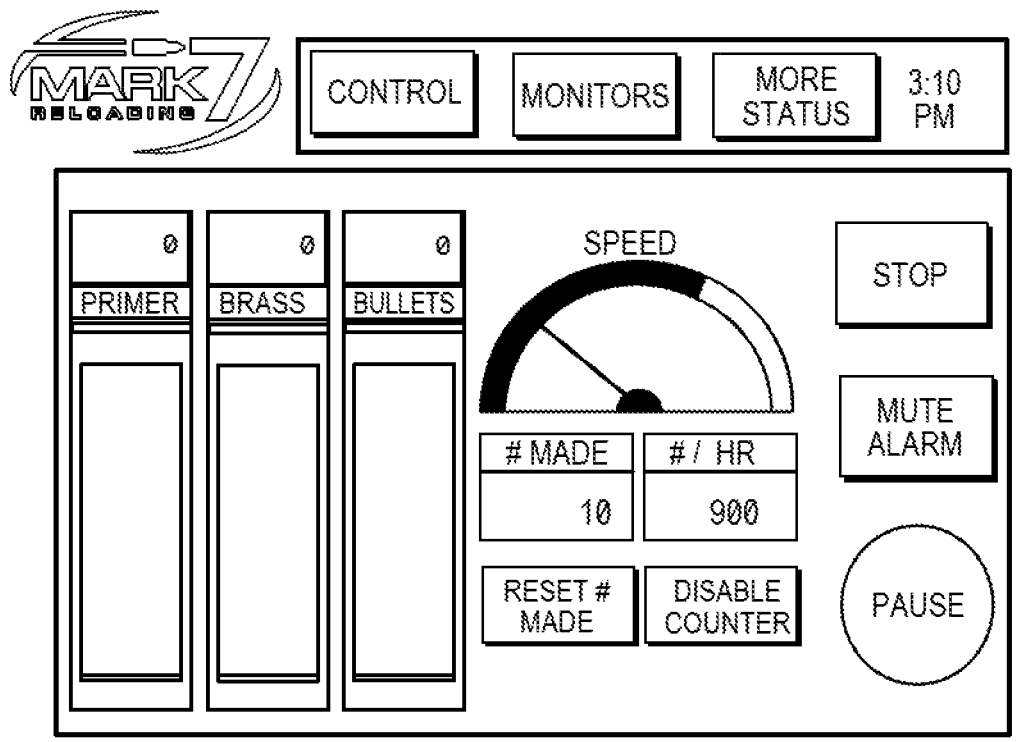
Figure 17:
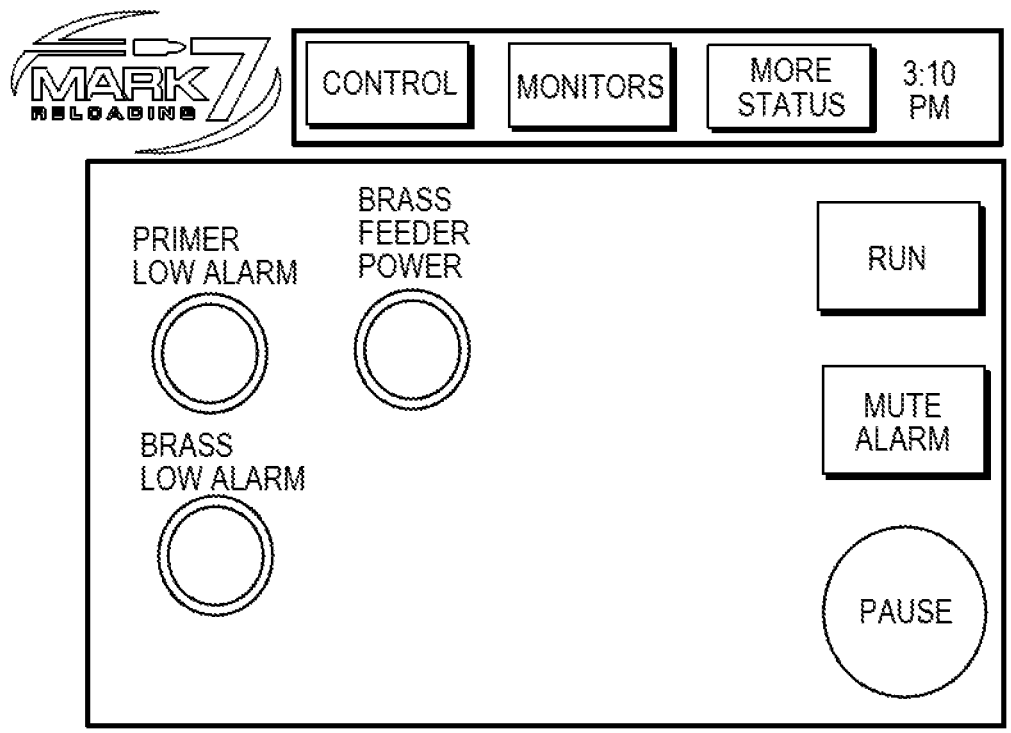
Figure 18:
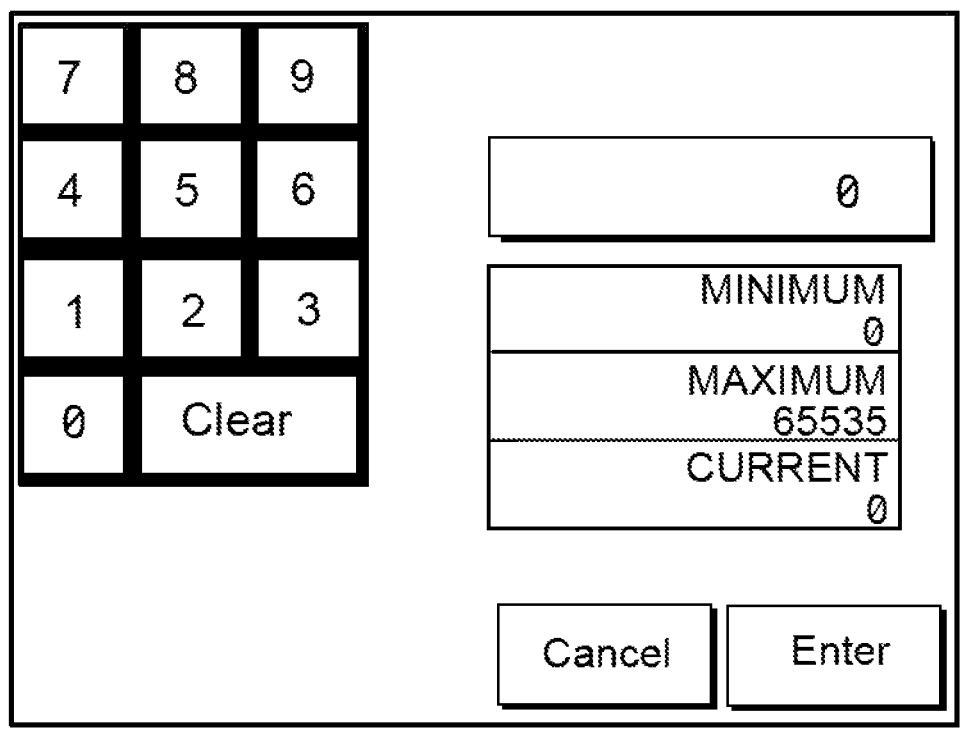

Screens of the GUI are shown in FIGS. 9, and 14 through 18. At the top of all three screens, except as shown in FIG. 18, are three buttons that allow navigation among the screens. The control button brings the user to the screen shown in FIG. 9. The monitors button brings the user to the screen shown in FIG. 14. The more status button brings the user to the screen shown in FIG. 15.

The primary user controls are the "Run", "Pause", "Jog Up", and "Jog Down", "Home" "Screen Saver", and "Single Cycle" buttons four speed setting buttons: "Slow", "Med", "Fast", and "Very Fast".

In FIG. 9, beginning when the "Run" button is pressed, the reloader operates until the "Pause" button is pressed or an alarm is triggered that automatically stops the reloader. When the "Pause" button is pressed, the "Run" button automatically turns into a "Stop" button (see FIG. 14). Pressing the "Stop" button enables the reloader to complete the current processing cycle and then stops the reloader. Pressing the "Pause" button interrupts the current reloader processing cycle at any time, changes the "Pause" button into an "Un-pause" button, and maintains the state of the reloader as of the time of the pause, until the reloader is un-paused when the user touches the "Un-pause" button. Pressing the "Jog Up" and "Jog Down" buttons cause the tool support of the reloader to be jogged respectively up and down at a slow rate, which is useful when the user is setting up the press or clearing a jam in the reloader. Pressing any of the speed setting buttons will set the running speed of the reloader accordingly.

In the screen shown in FIG. 16, the user can set the quantity of each of the supplies of primers, shells, and bullets that is to be associated with an alarm condition. Pressing any of these buttons reveals the screen shown in FIG. 18 where the user uses the keys of a numeric keypad to enter a number of units desired for the alarm level. A guide on the right side of the screen shown in FIG. 16 shows Minimum, Maximum, and Current quantities of the supply for which the alarm level is being sent. As the reloader operates, the microprocessor counts down, from the alarm value that has been set, for each each of the units of a given kind and sounds an audible alarm or shots off the press when 0 quantity for that supply is reached.

Referring again to FIG. 16, pressing the "Reset #" button resets to a 0 value the alarm value for each of the three kinds of supplies. Pressing the "disable counter" button stops the counter from operating. There is a display that shows the total number of cartridges reloaded and the cartridges reloaded per hour. The "Pause" button on each of the screens operates like the "pause" button in the screen of FIG. 9, stopping the reloader immediately.

On all screens, the "mute alarm" button disables the alarm mechanism which includes an audible alarm or the mechanism stops the reloader from operating if the alarm level is reached, or both. The "Stop" button each of the screens operates like the "Stop" button on the screen of FIG. 9, which completes the current processing cycle of the reloader and then stops the reloader. There is a graph on FIG. 16 that indicates speed of the machine, depending on the speed profile selected.

In FIG. 17, the user can set the primer low alarm, the brass low alarm, and the brass feet are power alarm.

The "Run, Mute Alarm and Pause buttons on all of the screens operate as described above.

In addition to modifying settings for the automatic motorized operation of the reloader, the user can monitor parameters of the system 100 in real time. The parameters that can be monitored include, but are not limited to, instantaneous throughput (in other words the current rate at which reloaded cartridges are delivered from the reloader), cumulative output of cartridges beginning at a starting time, the speed and torque of the motor, the number of shells left, the number of bullets left, the number of primers left, and the types of alarms triggered. The user can then adjust the settings based on his observation of the displayed information.

In some embodiments, users may need to log in before using the system 100. The login can prevent unauthorized usage of the system 100.

FIG. 10 is an example flow diagram of how the real-time processor 103 collects user and sensor inputs and delivers motor setpoint commands. In some implementations, the steps in FIG. 10 can be performed in other orders, and one or more of the steps may be omitted. Firmware run by the microcontroller executes in an infinite loop, as long as power is supplied to the real-time processor 103, causing the processor to continuously monitor sensors and control the motor 107.

Upon power-up, the real-time processor 103 continuously acquires inputs of the user from the HMI 101. The HMI 101 closes one or a multiple of the output relays of the PLC to issue commands to the real-time processor 103. Multiple commands can be sent at the same time. In some implementations, serial commands can be sent periodically or upon a user input to the HMI 101.

Before receiving an HMI-ready command, the real-time processor 103 stays in a STOP state 303 and disables the motor 304 from operating. Once step 302 shows that the HMI is present and ready, the real-time processor 101 enables operation of the motor 305 (but does not cause the motor to run). If the received commands indicate that the "Pause" button is pressed 306, the real-time processor 101 goes into a HOLD state 307 and immediately sets the motor speed to zero 308. Upon the release of the "Pause" button or the pressing of the "Un-pause button", the real-time processor 103 is returned to its previous state.

When the "Pause" button is displayed but not pressed and the "Home" button is pressed, the HMI 101 sends a short square pulse to the real-time processor 103. This pulse initiates a home routine 313 on the real-time processor 103. The home routine 313 brings the tool support to its home position, that is, its highest vertical position in the reloader.

When the "Jog Up" button or the "Jog Down" button is pressed, the real-time processor 103 transitions into its JOG UP state 315 or its JOG DOWN state 318. The motor is commanded to move the tool support up 316 or down 319 at a very slow rate. When either the top or the bottom limit switch is triggered, the real-time processor 103 stops the motor from jogging up or down, respectively. For reloaders in which the press moves forward and backward in its processing cycle, the jog up and jog down functions are replaced with jog forward and jog backward.

When the "Run" button is pressed, the real-time processor 103 transitions into its automatic RUN state 321, during which it will continuously execute a run routine 322 that drives the tool support up and down and relocates the shell plate in successive processing cycles, until the "Stop" button is pressed or any of the alarm sensors 109, 110, 111 is triggered.

When no buttons have been pressed, the real-time processor 103 stays in an IDLE state 323 and sets the motor speed to zero 324.

FIG. 11 is an example flow diagram of the home routine 313 of the real-time processor. Upon power up of the system 100, the home routine 313 is executed so that the reloader can start operating from a home position. The home routine sets an absolute position of the tool support of the reloader 411, and calibrates a total travel for the press. During the home routine, the tool support is moved down 403 until the bottom limit switch is triggered and then is moved up 407 until the top limit switch is triggered. When the tool support triggers each of the bottom limit switch and the top limit switch, the user can add a small amount of trimmable travel distance 405, 409 while visually observing the operation of the reloader to cause the tool support to reach precise desired mechanical top and bottom positions at the limits of its travel. These trimmable extra travel distances can compensate for environmental changes, manufacturing imperfections, or long term drift in other electrical or mechanical components, or combinations of those effects.

At the end of the home routine 313, the real-time processor 103 commands the tool support to move down slightly 412 to release tension in the belt tension when the tool support is stationary and waiting for the system to begin running.

FIG. 12 is an example flow diagram of the automatic run routine 322, in which the speed of the tool support during the processing segment of the processing cycle is continuously adjusted by the real-time processor according to the sensed position of the tool support. When the run routine is configured at design time, The speed of motion of the tool support can be adjusted freely for any position of the tool support relative to the shell plate so that any desired profile of position, speed, and acceleration can be achieved through any part of or all of each of the processing cycles and can change from cycle to cycle. Multiple profiles of the run routine (and multiple speed options) can be designed and made available to the user through the HMI.

For example, the user can be provided with options to input commands to cause the reloader to switch from running slower to running faster or vice versa. In that case, the real-time processor can cause a slow acceleration or deceleration from the current speed to the new speed, to avoid jerkiness. And the real-time processor can vary the instantaneous speed of the tool support within the context of the new higher speed in portions of the processing cycle in which the new speed is inappropriately high. In this way, powder spillage during shell plate indexing, bullet seating problems, and other issues can be reduced or eliminated.

In some implementations, the real-time processor looks up and sets its motor speed 503, 509, 504, 510, based on the current location of the tool support, in real time. Therefore, the tool support can follow predefined speed and acceleration profiles and slow down at critical positions during a processing cycle to avoid tool support jerking issues.

When a stop is requested during a processing cycle, the real-time processor 103 stops the tool support at the end of the complete cycle 514. Similarly to the home routine 412, the tool support then moves down slightly to release the belt tension 516.

FIG. 13 shows three speed profiles, among an almost infinite ranges of possible profiles, in which motor speed is plotted against motor position. The motor speed is in units of percentage of a maximum available speed. The motor position is in units of percentage of the motor's maximum travel, where 0% corresponds to the motor position when the tool support is at its absolute top and 100% corresponds to the motor position when the tool support is at its absolute bottom. This plot illustrates three discrete motor speed profiles (labeled "slow", "medium" and "very fast") that incorporate five distinct motor speeds (represented by different levels of horizontal lines). Yet the motor speed can be adjusted continuously and need be set at fixed levels, and the motor speed profiles need not comprise only one or more static speed levels.

Even though the speeds of the motor differ dramatically for the three illustrated profiles as the tool support leaves its bottom position during an up stroke, the medium and very fast profiles begin to slow down at around 30% of the motor travel and dwell at the slow speed (along with the slow speed profile) between about 10% and 0% of the motor travel. During this tool support dwell period, the shell plate is being indexed (that is, is being moved to and reaches a very precise angular position around the central axis of the reloader so that all of the cartridges are accurately located to be acted on by the tools in the next processing cycle).

The tool support dwell shown in FIG. 13 helps to assure that that the shell plate is indexed relatively slowly, regardless of the brevity of each processing cycle. In other words, during a processing segment of a processing cycle, the motor can be run at a relatively high speed, and at the end of the processing segment of the cycle, during the relocation segment, as the shell plate is being indexed, the motor is run slowly for a brief dwell period. Because all three speed profiles slow down to the same slow speed when the motor is close to 0% of its travel, the tool support also reaches its top position at the same speed for all profiles, and thus travels to the same top position regardless of the average speed of the tool support during an overall processing cycle.

In some other implementations, the torque of the motor can be controlled according to torque profiles similar to the ones shown in FIG. 13, rather than or in addition to controlling the motor according to its speed).

Implementations of the devices and techniques that we have described enable a user to set up conditions for the fully automated control and operation of, for example, an existing hand-driven cartridge reloader such as the Dillon Super 1050. The reloader can then be operated automatically and safely to produce ready to use reloaded cartridges at a selected (for example, height) rate of production. The sensors provide information that is not only available for display to the user, but is used directly in a control loop by the controller to control the operation of the actuator (the servomotor). Various profiles of speed during each of the processing cycles can be designed and applied for various purposes, including a useful dwell period as the rotating cartridge support is being indexed to the next station. The user can specify alarm limits for the numbers of units of each of the supplies of components necessary for the reloading process. Then the controller can either alarm the user or stop the processing when any of the alarm limits as met. A wide variety of other functions can be achieved automatically to assure high-speed, accurate, and safe production of reloaded cartridges at high rates.

Other implementations are also within the scope of the following claims and other claims.

For example, a sensor can be mounted below the spent primer ejection port to verify that the spent primer has been removed from the case primer pocket, to enhance safe operation of the press.

The invention claimed is:

1. An apparatus comprising
a digitally controlled actuator having a connector for coupling to a drive mechanism of an existing hand-driven cartridge reloader, to actuate a series of processing cycles of the reloader in which supplies of components are subjected to successive mechanical processing steps to produce reloaded cartridges,
a sensor associated with the actuator or the reloader or both to (a) acquire digital information that is indicative of a range of motion of a portion of the actuator and (b) deliver the digital information to a digital controller for controlling the actuator or the reloader or both, the sensor comprising a shaft angle encoder,
the digital controller connected to receive the digital information from the sensor and to control automatic operation of the actuator or the reloader or both.

2. The apparatus of claim 1 in which the actuator comprises a servo motor.

3. The apparatus of claim 1 in which the drive mechanism of the reloader includes an eccentrically rotating input shaft, the actuator includes a circularly rotating output shaft and the connector is configured to enable the circular rotation of the output shaft to drive the eccentrically rotating input shaft of the reloader.

4. The apparatus of claim 1 in which the digital controller controls automatic operation of the controller by controlling a profile of motion of the actuator during each of the processing cycles.

5. The apparatus of claim 4 in which the motion profile comprises a speed profile.

6. The apparatus of claim 1 comprising another sensor configured to provide digital information indicative of the depletion of supplies of components used in the production of the reloaded cartridges.

7. The apparatus of claim 6 in which the components comprise at least one of: cartridges, primers, powder, or bullets.

8. The apparatus of claim 1 in which the automatic operation of the reloader is interrupted automatically when an alarm condition occurs.

9. The apparatus of claim 8 in which the alarm condition comprises an inadequate supply of a component used in the reloading or a failure of one of the processing steps to be completed correctly.

10. The apparatus of claim 1 comprising a user interface coupled to the controller to provide information to the user about operation of the reloader and to enable the user to provide commands and parameters to the controller.

11. The apparatus of claim 1 in which the digital controller controls a dwell period of the reloader during a portion of each of the processing cycles.

12. The apparatus of claim 11 in which the dwell period occurs at the end of each of the processing cycles as the reloader moves cartridges to new stations at which processing steps are performed.

13. The actuator of claim 1 in which the reloader has a support for cartridges to be reloaded, the support being movable to index the cartridges to precise positions at successive processing stations of the reloader, between processing steps of the reloading, and the controller controls the actuator to drive the reloader in a mode for indexing the cartridge that is different from a mode for the processing steps.

14. The apparatus of claim 13 in which the indexing mode includes a speed of operation slower than the speed of operation of the processing steps.

15. The apparatus of claim 13 in which the controller controls the actuator to transition from the indexing mode to the processing mode gradually to improve a precision of the indexing.

16. The apparatus of claim 4 in which the profile spans an entire processing cycle of the cartridge reloader.

17. The apparatus of claim 4 in which the profile is predetermined.

18. The apparatus of claim 4 in which a user can select the profile from among a set of profiles.

19. The apparatus of claim 4 in which the profile includes a duty cycle of the processing cycle.

20. The apparatus of claim 4 in which the profile comprises at least one of position, speed, or acceleration.

21. The apparatus of claim 4 in which the profile includes a portion applicable to an indexing of the support to the successive processing stations.

22. The apparatus of claim 1 comprising a resilient timing belt between the actuator and the reloader to smooth driving of the reloader by the actuator.

23. The apparatus of claim 1 in which the sensor comprises an optical sensor added to the existing hand-driven reloader.

24. The apparatus of claim 1 in which the actuator comprises a servomotor and a gear reduction device to couple the servomotor to the reloader.

25. The apparatus of claim 1 comprising an emergency kill switch by which a user can immediately stop operation of the reloader.

26. The apparatus of claim 1 comprising another sensor configured to determine the state of a dimension of one of the cartridges or a component of one of the cartridges relative to a predetermined dimension.

27. The apparatus of claim 1 in which the range of motion comprises a range of angles of a shaft of the actuator.

28. The apparatus of claim 1 in which the range of motion comprises a range of speeds of a motor of the actuator.

29. The apparatus of claim 1 in which the sensor is configured to determine the state of a dimension of one of the cartridges or a component of one of the cartridges relative to a predetermined dimension.

30. An apparatus comprising
a digitally controlled actuator configured to be coupled to a drive mechanism of an existing hand-driven cartridge reloader, to actuate a series of processing cycles of the reloader in which supplies of components are subjected to successive mechanical processing steps to produce reloaded cartridges,
the actuator having a sensor configured to detect a state of operation of the actuator, the sensor comprising a shaft angle encoder, and
a digital controller configured to receive a signal from the sensor corresponding to the state of operation of the actuator and to control automatic operation of the reloader based on the signal.

31. The apparatus of claim 30 in which the actuator is configured for back and forth motion between a first position and a second position, and the sensor is configured to detect the actuator reaching the first position or the second position or both.

32. The apparatus of claim 30 in which the back-and-forth motion comprises rotational motion of a shaft and the first position and second position comprise angular positions of the shaft.

33. The apparatus of claim 31 in which the first position and the second position correspond respectively to an uppermost position and a lowermost position of a tool support of the cartridge reloader.

34. The apparatus of claim 33 in which the sensor is configured to detect both the first position and the second position.

35. The apparatus of claim 30 in which the state of operation of the actuator is detected mechanically and converted to an electrical signal.

36. The apparatus of claim 30 in which the state of operation of the actuator comprises an angular position of a shaft of the actuator.

37. An apparatus comprising
a digitally controlled actuator having a connector for coupling to a drive mechanism of an existing hand-driven cartridge reloader, to actuate a series of processing cycles of the reloader in which supplies of components are subjected to successive mechanical processing steps to produce reloaded cartridges,
a first sensor associated with the actuator or the reloader or both to (a) acquire digital information that is indicative of a range of motion of a portion of the actuator and (b) deliver the digital information to a digital controller for controlling the actuator or the reloader or both, and
a second sensor configured to determine a dimension of one of the cartridges or a component of one of the cartridges relative to a predetermined dimension and to deliver information about the determined dimension to a digital controller,
the digital controller connected to receive the digital information from the first sensor and the second sensor and to control automatic operation of the actuator or the reloader or both.

38. The apparatus of claim 37 in which the actuator comprises a servo motor.

39. The apparatus of claim 37 in which the drive mechanism of the reloader includes an eccentrically rotating input shaft, the actuator includes a circularly rotating output shaft and the connector is configured to enable the circular rotation of the output shaft to drive the eccentrically rotating input shaft of the reloader.

40. The apparatus of claim 37 in which the digital controller controls automatic operation of the controller by controlling a profile of motion of the actuator during each of the processing cycles.

41. The apparatus of claim 40 in which the motion profile comprises a speed profile.

42. The apparatus of claim 37 comprising a third sensor configured to provide digital information indicative of the depletion of supplies of components used in the production of the reloaded cartridges.

43. The apparatus of claim 42 in which the components comprise at least one of: cartridges, primers, powder, or bullets.

44. The apparatus of claim 37 in which the automatic operation of the reloader is interrupted automatically when an alarm condition occurs.

45. The apparatus of claim 37 in which the alarm condition comprises an inadequate supply of a component used in the reloading or a failure of one of the processing steps to be completed correctly.

46. The apparatus of claim 37 comprising a user interface coupled to the controller to provide information to the user about operation of the reloader and to enable the user to provide commands and parameters to the controller.

47. The apparatus of claim 37 in which the digital controller controls a dwell period of the reloader during a portion of each of the processing cycles.

48. The apparatus of claim 47 in which the dwell period occurs at the end of each of the processing cycles as the reloader moves cartridges to new stations at which processing steps are performed.

49. The actuator of claim 37 in which the reloader has a support for cartridges to be reloaded, the support being movable to index the cartridges to precise positions at successive processing stations of the reloader, between processing steps of the reloading, and the controller controls the actuator to drive the reloader in a mode for indexing the cartridge that is different from a mode for the processing steps.

50. The apparatus of claim 49 in which the indexing mode includes a speed of operation slower than the speed of operation of the processing steps.

51. The apparatus of claim 49 in which the controller controls the actuator to transition from the indexing mode to the processing mode gradually to improve a precision of the indexing.

52. The apparatus of claim 40 in which the profile spans an entire processing cycle of the cartridge reloader.

53. The apparatus of claim 40 in which the profile is predetermined.

54. The apparatus of claim 40 in which a user can select the profile from among a set of profiles.

55. The apparatus of claim 40 in which the profile includes a duty cycle of the processing cycle.

56. The apparatus of claim 40 in which the profile comprises at least one of position, speed, or acceleration.

57. The apparatus of claim 40 in which the profile includes a portion applicable to an indexing of the support to the successive processing stations.

58. The apparatus of claim 40 comprising a resilient timing belt between the actuator and the reloader to smooth driving of the reloader by the actuator.

59. The apparatus of claim 37 in which the first sensor comprises an optical sensor added to the existing hand-driven reloader.

60. The apparatus of claim 37 in which the actuator comprises a servomotor and a gear reduction device to couple the servomotor to the reloader.

61. The apparatus of claim 37 comprising an emergency kill switch by which a user can immediately stop operation of the reloader.

* * * * *

UNITED STATES PATENT AND TRADEMARK OFFICE
CERTIFICATE OF CORRECTION

PATENT NO. : 10,281,253 B2
APPLICATION NO. : 15/535176
DATED : May 7, 2019
INVENTOR(S) : Martin Stark et al.

Page 1 of 1

It is certified that error appears in the above-identified patent and that said Letters Patent is hereby corrected as shown below:

In the Claims

Column 18, Line 19 (approx.): In Claim 49, delete "actuator" and insert -- apparatus --, therefor.

Signed and Sealed this
Second Day of July, 2019

Andrei Iancu
*Director of the United States Patent and Trademark Office*